E. G. MATTHEWS,

Assignor, by mesne assignments, to D. TRUE.

Dory-Boat Knee.

No. 9,089. Reissued Feb. 17, 1880.

WITNESSES

Jas. W. Reed Jr.

George V. Mallon

INVENTOR

Elbridge G. Matthews

By his Atty.

Henry W. Williams

N. PETERS, PHOTO-LITHOGRAPHER, WASHINGTON, D. C.

UNITED STATES PATENT OFFICE.

ELBRIDGE G. MATTHEWS, OF ST. CLOUD, MINNESOTA, ASSIGNOR, BY MESNE ASSIGNMENTS, TO DAVID TRUE.

DORY-BOAT KNEE.

SPECIFICATION forming part of Reissued Letters Patent No. 9,089, dated February 17, 1880.

Original No. 76,487, dated April 7, 1868. Application for Reissue filed January 19, 1880.

*To all whom it may concern:*

Be it known that I, ELBRIDGE G. MATTHEWS, formerly of Boothbay, in the county of Lincoln and State of Maine, but now of St. Cloud, Stearns county, Minnesota, have invented certain new and useful Improvements in Dory-Boat Knees, of which the following is a specification.

Figure 1:
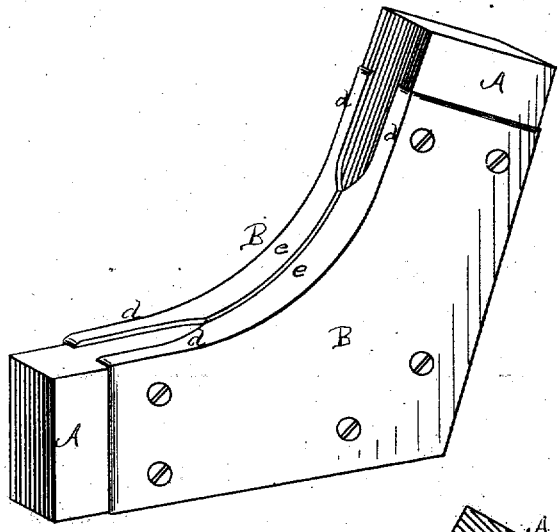
Figure 2:
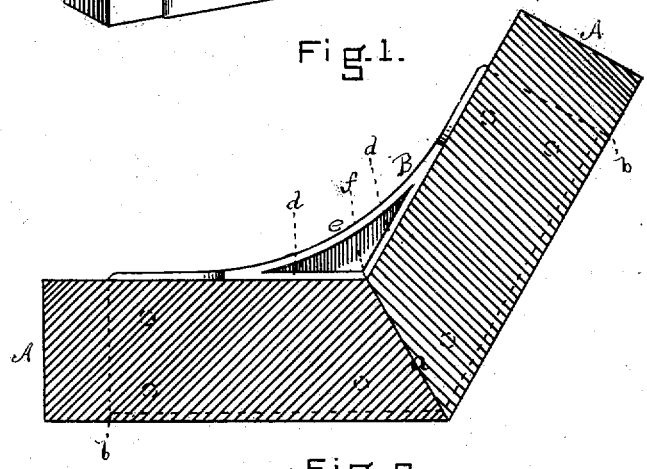
Figure 3:
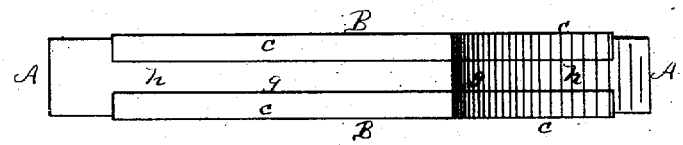

In the accompanying drawings, in which similar letters of reference indicate like parts, Figure 1 is a view, in perspective, of my improved knee. Fig. 2 is a longitudinal central section. Fig. 3 is a view of the under side.

Dory-boat knees have heretofore been made of wood bent artificially or naturally into the required shape, or have been sawed out, often against the grain of the wood, in which case they have been liable to split or open, thus rendering the boat unserviceable.

In my improvement, in which all such objections are obviated, the knee is made in two pieces whose ends abut against each other at the point where the bend occurs in a boat-knee, said pieces being held together by means of external plates secured firmly to the two portions of the knee.

The usual method of applying the plates to the two portions of the knee is as follows:

A A represent the inner ends of the two portions of my knee, cut lengthwise of the grain and fitted to abut against each other at *a*. The under sides of the pieces A A are cut out, as shown at *b b*, to receive the under flanges, *c c*, of the metal knee-supports or holding-plates B B, which are also provided with upper flanges, *d d*, and curved upper guards, *e e*, the latter joining the flanges *d d* at each end, as shown in Figs. 1 and 2. The upper guards, *e e*, not only shield the flanges *d d* from injury at the points *f*, but also allow of a circulation of air past the joint *a*, which prevents decay and rot at that point.

The flanges are fitted in flush with faces *g g* of the pieces A A, so that the bottom boards of the boat can be nailed to the central parts, *h h*, of the pieces A A, to make a tight fit and yet have a support against the flanges *c c*.

The plates or supports B B are firmly screwed, bolted, or otherwise secured to the pieces A A, thus giving great strength to the knee, preventing any liability of breakage at or injury to the joint, and by means of its peculiar construction affording ventilation at the upper part of the joint.

Having thus fully described my invention, what I claim, and desire to secure by Letters Patent, is—

1. The combination, with the two portions A A of a boat-knee, of two plates secured to and flanking the sides of said portions A A, for the purpose set forth.

2. The combination, with the two portions A A of the boat-knee, of the plates B B, provided with the flanges and guards *c d e*, substantially as and for the purpose described.

ELBRIDGE G. MATTHEWS.

Witnesses:

D. B. SEARLE,

F. TOLMAN.